United States Patent [19]

Noda

[11] Patent Number: 5,607,740
[45] Date of Patent: Mar. 4, 1997

[54] MAGNETIC DISC

[75] Inventor: Makoto Noda, Kanagawa, Japan

[73] Assignee: Sony Corporation, Tokyo, Japan

[21] Appl. No.: 322,985

[22] Filed: Oct. 14, 1994

[30] Foreign Application Priority Data

Oct. 20, 1993 [JP] Japan .................... 5-262088

[51] Int. Cl.$^6$ ........................................ G11B 5/66
[52] U.S. Cl. ................ 428/65.3; 428/65.5; 428/65.7;
428/336; 428/666; 428/667; 428/694 T;
428/694 TS; 428/694 TP; 428/694 TM;
428/900
[58] Field of Search ..................... 428/336, 694 T,
428/694 TS, 694 TP, 694 TM, 900, 65.3,
65.5, 65.7, 666, 667

[56] References Cited

U.S. PATENT DOCUMENTS

| | | | |
|---|---|---|---|
| 4,748,628 | 6/1988 | Ahlert | 428/660 |
| 4,920,013 | 4/1990 | Koboyoshi | 428/684 TM |
| 5,051,288 | 9/1991 | Ahlert | 428/65.7 |
| 5,227,212 | 7/1993 | Ahlert | 360/97.01 |

*Primary Examiner*—Leszek Kiliman
*Attorney, Agent, or Firm*—Hill, Steadman & Simpson

[57] ABSTRACT

A magnetic disc according to this invention is of a structure in which underlying layer and magnetic layer are formed in succession on non-magnetic substrate, and one non-magnetic intermediate layer or more and one second magnetic layer or more are further stacked one after another thereon. The non-magnetic intermediate layer is formed as film layer by sputtering, and film thickness calculated by film formation rate and film formation time is 0.2 nm~1.0 nm. Thus, with this magnetic disc, coercive force is improved. Accordingly, signals can be recorded at higher density. As a result, application to magnetic disc devices of larger memory capacity can be made.

11 Claims, 2 Drawing Sheets

MAGNETIC DISC

BACKGROUND OF THE INVENTION

1. Field of the Invention

This invention relates to a magnetic disc for high density recording in which coercive force has been improved, such as, for example, a magnetic disc for in-plane recording used for hard disc drive, or the like.

2. Description of the Related Art

In magnetic discs mounted in a hard disc system, etc. used for external memory device of computer, etc., attempt has been made to allow the wavelength of a recording signal to be shorter with implementation of high density recording of information. Moreover, with such implementation of high density recording, improvement in output-to-noise ratio, i.e., signal-to-noise ratio (S/N) of reproduction signal is one of important tasks to be attained.

In magnetic discs, for the purpose of improving the S/N, improvement in reproduction output and lowering of medium noise are required. First, in order to improve reproduction output, particularly in the case where wavelength of a recording signal is short, it is effective to employ a method in which coercive force of medium is improved to thereby reduce magnetic transition width (transition width in magnetization) at the time of recording signals thus to reduce interference between reproduction waveforms. On the other hand, for the purpose of lowering medium noise, it is said that it is effective to lower exchange bonding strength between magnetic fine particles within the magnetic layer. In addition, it is known that lowering of exchange bonding strength between magnetic fine particles is confirmed as lowering of coercive force rectangular ratio of medium.

In recent years, as an effective method for attaining, at the same time, improvement in medium coercive force and reduction of exchange interaction between magnetic fine particles, there have been proposed a method in which introduction gas such as Ar, etc. is caused to have higher pressure of the order of 2–3 Pa in sputtering a thin film magnetic layer including Co, etc. as major component onto a non-magnetic substrate to micro-crystallize magnetic fine particles sputtered, a method in which a non-magnetic intermediate layer is provided within a magnetic layer to allow the magnetic layer to be of stacked structure, and the like.

As a medium in which magnetic layer is caused to be of staked structure, many media in which non-magnetic intermediate layer such as Cr, etc is provided within a magnetic layer comprised of Co—Ni—Cr, Co—Cr—Ta, or Co—Pt—Cr, etc. have been reported until now. However, it could not be said that sufficient coercive force has been ensured with such media.

OBJECT AND SUMMARY OF THE INVENTION

This invention has been proposed in view of such actual circumstances, and its object is to provide a magnetic disc having higher coercive force.

To achieve the above-mentioned object, in accordance with this invention, there is provided a magnetic disc in which an underlying layer and a magnetic layer are formed in succession on a non-magnetic substrate, and one non-magnetic intermediate layer or more and one second magnetic layer or more are stacked one after another thereon, wherein film thickness of the non-magnetic intermediate layer is set to 0.2~1.0 nm which is a numeric value calculated by product of sputtering rate and sputtering time.

The reason why numeric value calculated by product of sputtering rate and sputtering time is employed as film thickness of the non-magnetic intermediate layer is as follows. Namely, since there are instances where element or elements constituting the non-magnetic intermediate layer may undergo diffusion, etc. into the magnetic layer at the time of forming non-magnetic intermediate layer, there are instances where it is difficult to clearly define boundary between magnetic layer and non-magnetic intermediate layer. In addition, when distance between atoms constituting the non-magnetic intermediate layer, or the like is taken into consideration, it is difficult to consider that such thin film is uniformly formed on the magnetic layer.

It should be noted that setting is made such that film thickness of the non-magnetic intermediate layer is less than 1.0 nm, thereby making it possible to improve coercive force to more degree as compared to that of non-magnetic intermediate layer having film thickness of 1.0 nm or more. In this case, however, if film thickness less than 0.2 nm is employed, coercive force would be rather lowered.

While one non-magnetic intermediate layer and one second magnetic layer may be stacked on the underlying layer and the magnetic layer, such layers may be stacked repeatedly one after another.

For example, an example of the former is shown in FIG. 1 and an example of the latter is shown in FIG. 2. Commonly in both examples, underlying layer 2 is formed on non-magnetic substrate 1 and magnetic layer 3a is provided thereon. In the magnetic disc of FIG. 1, non-magnetic intermediate layer 4 and magnetic layer (second magnetic layer) 3b are further formed thereon, and protective film layer 5 is provided on the surface. Namely, there is provided the configuration in which magnetic layer 3 is divided into two layers 3a, 3b and non-magnetic intermediate layer 4 is interposed therebetween.

On the other hand, magnetic disc of FIG. 2 is of a structure in which non-magnetic intermediate layers 4 and magnetic layers 3 are stacked repeatedly twice one after another on magnetic layer 3a in a manner of non-magnetic intermediate layer 4a, magnetic layer (second magnetic layer) 3b, non-magnetic intermediate layer 4b, magnetic layer (third magnetic layer) 3c, and protective film layer 5 is provided on the surface. Namely, magnetic layer 3 is divided into three layers 3a, 3b, 3c, and non-magnetic intermediate layers 4a, 4b are respectively interposed therebetween. It should be noted that while magnetic layers except for layer 3a are respectively called second and third layers in the example of FIG. 2, layer or layers except for layer 3a is or are assumed to be called second layer or layers in general expression.

It is a matter of course that there may be employed a configuration in which magnetic layer 3 is divided into a larger number of layers and non-magnetic intermediate layers 4 are interposed between respective layers.

Each of materials of underlying layer and non-magnetic intermediate layer of magnetic disc according to this invention is not particularly limited if there is employed, as such a material, material which can take body centered cubic (bcc) crystal structure as ordinarily used as underlying layer and intermediate layer in magnetic disc for in-plane magnetic recording of this kind, such as, for example, Cr, Mo, W, Si, Al, V, etc. It is preferable that material containing Cr is employed. The reason why such material is employed is that c-axis of that crystal is generally in-plane oriented along (110) plane crystal orientation of Cr in magnetic layer of Co system.

It should be noted that while film thickness of the non-magnetic intermediate layer is as previously described, film thickness of underlying layer is preferably 10~200 nm. If film thickness is less than 10 nm, satisfactory coercive force cannot be obtained. On the other hand, if film thickness is greater than 200 nm, internal stress of the underlying layer is increased, so crack is apt to take place.

Further, material of magnetic layer is not particularly limited if there is employed, as such a material, material ordinarily used in magnetic disc of this kind, such as, for example, Co—Ni—Cr, Co—Cr—Ta, Co—Cr—Pt, Co—Pt—Cr, Co—Pt, etc. It is preferable that material containing Pt which can obtain particularly higher coercive force in experiment is employed. It should be noted that while magnetic layer is divided into a plurality of layers, it is preferable that total thickness of those magnetic layers is 10~100 nm. Although optimum value varies in dependency upon wavelength of recording signal, magnetic head used or the like, if total thickness of those magnetic layers is less than 10 nm, because quantity of residual magnetization when signal is recorded is very small, there may take place a problem such that reproduction output is remarkably deteriorated. On the other hand, if total thickness of those magnetic layers is greater than 100 nm, so called thickness loss at the time of recording signals is increased, similarly giving rise to a problem such that reproduction output in short wavelength region is remarkably deteriorated.

It should be noted that, in the magnetic disc according to this invention, it is preferable that protective film layer containing, as major component, C, $Z_rO_2$, $S_iO_2$, etc. is provided on the surface, and it is preferable that protective layer is formed so that its film thickness falls within the range of 10~50 nm. If film thickness of the protective film layer is less than 10 nm, durability (so called CSS characteristic) of magnetic disc in starting or stopping it with respect to magnetic head of actual hard disc drive in the state in contact therewith is remarkably deteriorated, and preservation effect of magnetic layer is also inferior. On the other hand, if film thickness is greater than 50 nm, distance between magnetic layer and magnetic head is increased. As a result, so called spacing loss is increased, thus resulting in deteriorated reproduction output.

Material of non-magnetic substrate is not particularly limited if material ordinarily used in magnetic disc of this kind, such as, for example, $N_iP/Al$, tempered glass, crystallized glass or plastic, etc. is employed.

In accordance with the magnetic disc of this invention thus constituted, underlying layer and magnetic layer are formed in succession on non-magnetic substrate and one non-magnetic intermediate layer or more and one second magnetic layer or more are stacked one after another thereon. Thus, when film thickness of the non-magnetic intermediate layer is set to 0.2~1.0 nm which is a numeric value calculated by product of sputtering rate and sputtering time, coercive force can be further improved.

Although the reason why coercive force is improved by limiting film thickness of the non-magnetic intermediate layer as described above is not clear, it is considered that film thickness of 0.2~1.0 nm is a film thickness corresponding to one atom layer~two atom layer of material constituting non-magnetic intermediate layer, and non-magnetic intermediate layer of such a film thickness provides greater effect for particularly weakening magnetic interaction between magnetic layers.

DESCRIPTION OF THE PREFERRED EMBODIMENT

A preferred embodiment in more practical sense to which this invention is applied will now be described on the basis of experimental results.

Figure 1:
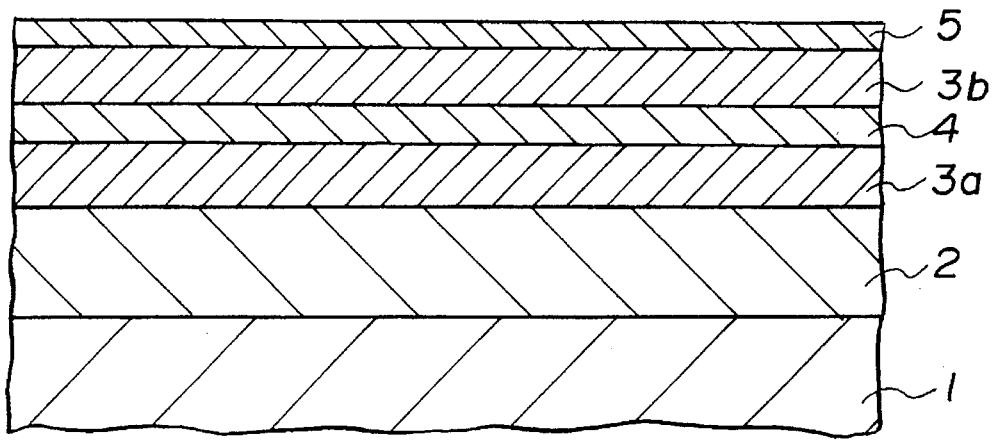
FIG. 1 is a cross sectional view showing, in a model form, an example of a magnetic disc according to this invention.
Figure 2:
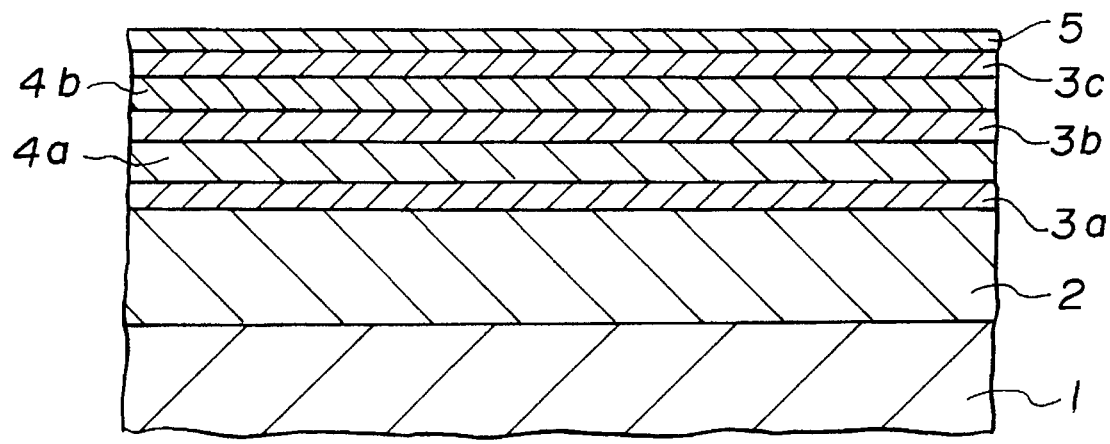
FIG. 2 is a cross sectional view showing, in a model form, another example of a magnetic disc according to this invention.

A$_1$ magnetic disk made up here has a configuration shown in FIG. 1, in which underlying layer 2 is formed on non-magnetic substrate 1, magnetic layer 3a is provided thereon, non-magnetic intermediate layer 4 and magnetic layer (second magnetic layer) 3b are further formed thereon, and protective film layer 5 is provided on the surface. Namely, this magnetic disc includes a configuration in which magnetic layer 3 is divided into two layers 3a, 3b and non-magnetic intermediate layer 4 is interposed therebetween.

It should be noted that glass ceramic substrate was used as non-magnetic substrate 1, Cr film was used as underlying layer 2, Co—Cr—Pt film or Co—Pt film was used as magnetic layer 3, and Cr film was used as non-magnetic intermediate layer 4.

A magnetic disc as described above is made up as follows. Initially, by using in-line stationary opposed DC magnetron sputtering system, Cr film (underlying film 2), Co—Cr—Pt film or Co—Pt film (magnetic layer 3a), Cr film (non-magnetic intermediate layer 4), and Co—Cr—Pt film or Co—Pt film (magnetic layer 3b) were formed in succession on glass ceramic substrate (non-magnetic substrate) 1. In this case, the above-mentioned films were all formed at room temperature by using Ar gas wherein background pressure within chamber before introduction of Ar gas was set to $2 \times 10^{-6}$ Pa, Ar gas pressure at the time of sputtering was set to 0.2 Pa, and making power was set to 20 kW/m$^2$. In addition, with respect to target, Cr was used in forming Cr film and Co—Cr—Pt alloy or Co—Pt alloy was used in forming Co—Cr—Pt film or Co—Pt film.

In this case, film thickness of underlying layer 2 of Cr film was set to 100 nm, and film thickness of Cr film as non-magnetic intermediate layer 4 was varied within the range of 0~7nm by numeric value calculated by product of sputtering rate and sputtering time. Further, in the case where Co—Cr—Pt film is used as magnetic layer 3, total film thickness was set to 60 nm. On the other hand, in the case where Co—Pt film is used as magnetic layer 3, total film thickness was set to 36 nm.

After underlying layer 2, magnetic layer 3a, non-magnetic intermediate layer 4, and magnetic layer 3b were formed in succession in a manner as described above, protective film layer 5 was formed. Thus, sample of magnetic disk was made up.

Figure 3:
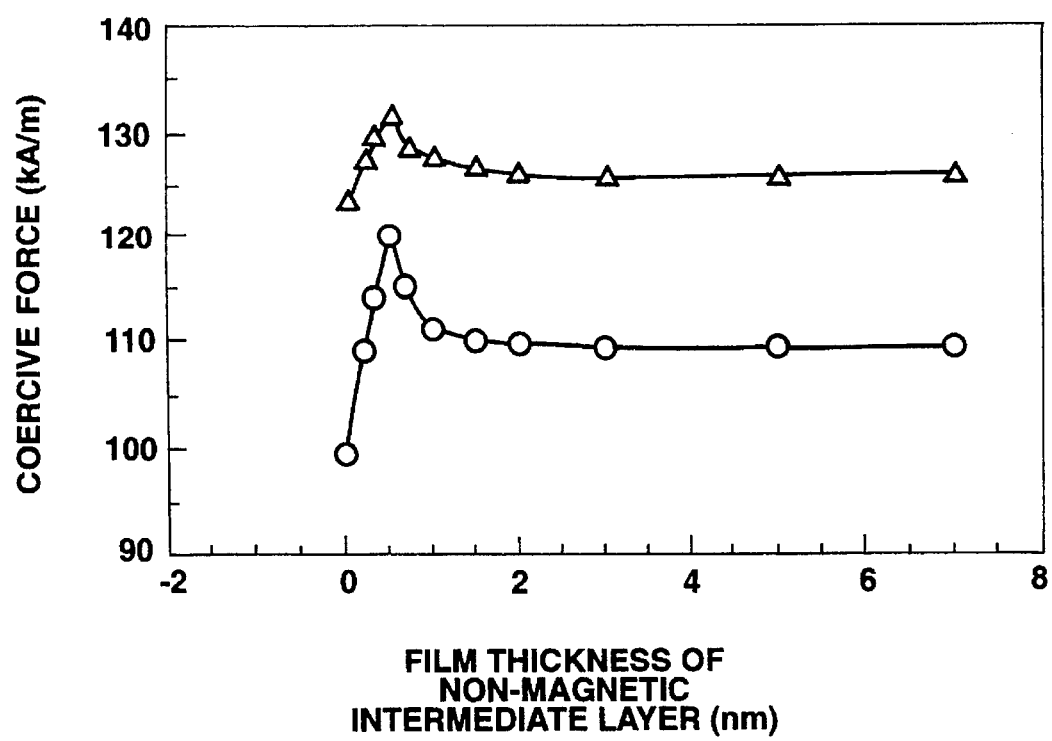
FIG. 3 is a characteristic diagram showing the relationship between film thickness of non-magnetic intermediate layer and coercive force in a magnetic disc including, as a magnetic layer, Co—Cr—Pt system magnetic thin film or Co—Pt system magnetic thin film.

With respect to samples of magnetic discs made up in this way, measurement of coercive force was conducted. These results were shown in FIG. 3 as the relationship between film thickness of Cr film serving as non-magnetic intermediate layer 4 and coercive force in connection with samples where Co—Cr—Pt film was used as magnetic layer 3 and samples where Co—Pt film was used as magnetic layer 3. In FIG. 3, results of samples where Co—Cr—Pt film was used as magnetic layer 3 are indicated by mark o, and results of samples where Co—Pt film was used as magnetic layer 3 are indicated by mark Δ.

From FIG. 3, it has been found that irrespective of whether samples where Co—Cr—Pt film is used as magnetic layer 3 are employed or samples where Co—Pt film is used as magnetic layer 3 are employed, film thickness of Cr film serving as non-magnetic intermediate layer 4 provided within magnetic layer 3 is set to less than 1 nm, thereby making it possible to improve coercive force to much degree. In addition, it has been also found that when film thickness of Cr film is about 0.5 nm, coercive force becomes maximum, and when that film thickness is thinner than 0.5 nm, coercive force is rather lowered.

From the above-mentioned results, it has been found that film thickness of non-magnetic intermediate layer provided within the magnetic layer is set to 0.2~1 nm, thereby making it possible to improve coercive force of magnetic disc.

As is clear from the foregoing description, the magnetic disc according to this invention is of a structure in which underlying layer and magnetic layer are formed in succession on non-magnetic substrate, and one non-magnetic intermediate layer or more and one second magnetic layer or more are further stacked one after another thereon, wherein film thickness of the non-magnetic intermediate layer is set to 0.2~1.0 nm which is a numeric value calculated by product of sputtering rate and sputtering time, thereby permitting the magnetic disc to have higher coercive force.

Thus, signals can be recorded at higher density. For this reason, application to magnetic disc devices of larger memory capacity can be made. Accordingly, the industrial value of this invention is very large.

What is claimed is:

1. A magnetic disc comprising:

a non-magnetic substrate having a surface;

an underlying layer disposed on said surface;

a first magnetic layer disposed on said underlying layer;

a non-magnetic intermediate layer disposed on said first magnetic layer; and a second magnetic layer disposed on said non-magnetic intermediate layer, said non-magnetic intermediate layer comprising a sputtered film layer having a film thickness calculated by a product of film formation rate and film formation time and being from about 0.2 nm to about 1.0 nm, and said underlying layer and said non-magnetic intermediate layer having a body centered cubic crystal structure.

2. A magnetic disc as defined in claim 1 wherein the underlying layer, the non-magnetic intermediate layer, or both the underlying layer and the non-magnetic intermediate layer contain Cr.

3. A magnetic disc as defined in claim 1 wherein the underlying layer, the non-magnetic intermediate layer, or both the underlying layer and the non-magnetic intermediate layer consist of Cr film.

4. A magnetic disc as defined in claim 1 wherein the magnetic layer comprises Co—Pt alloy film or Co—Cr—Pt alloy film.

5. A magnetic disc as defined in claim 1 wherein further comprises a protective film layer.

6. A magnetic disc as defined in claim 1, further comprising additional magnetic layers with additional non-magnetic intermediate layers disposed therebetween, each of said additional non-magnetic intermediate layers comprising a sputtered film layer having a thickness of from about 0.2 nm to about 1.0 nm and having a body centered cubic crystal structure.

7. A magnetic disc comprising:

a non-magnetic substrate having a surface;

an underlying layer disposed on said surface;

a first magnetic layer disposed on said underlying layer;

a non-magnetic intermediate layer disposed on said first magnetic layer;

a second magnetic layer disposed on said non-magnetic intermediate layer; and said magnetic disc optionally further comprising additional magnetic layers with additional non-magnetic intermediate layers disposed therebetween, each said non-magnetic intermediate layer comprising a sputtered film layer having a film thickness calculated by a product of film formation rate and film formation time and being from about 0.2 nm to about 1.0 nm, and said underlying layer and each said non-magnetic intermediate layer having a body centered cubic crystal structure.

8. A magnetic disc as defined in claim 7 wherein the underlying layer, each said non-magnetic intermediate layer, or both the underlying layer and each said non-magnetic intermediate layer contain cr.

9. A magnetic disc as defined in claim 7 wherein the underlying layer, each said non-magnetic intermediate layer, or both the underlying layer and each said non-magnetic intermediate layer consist of Cr film.

10. A magnetic disc as defined in claim 7 wherein each magnetic layer comprises Co—P alloy film or Co—Cr—Pt alloy film.

11. A magnetic disc as defined in claim 7 which further comprises a protective film layer.

* * * * *